United States Patent
Williams

(10) Patent No.: US 6,796,111 B2
(45) Date of Patent: Sep. 28, 2004

(54) BLADE HOLDING ASSEMBLY FOR ROTARY CUTTING MACHINE

(76) Inventor: Charles G. Williams, 1432 Forbes St., Fredericksburg, VA (US) 22405

( * ) Notice: Subject to any disclaimer, the term of this patent is extended or adjusted under 35 U.S.C. 154(b) by 5 days.

(21) Appl. No.: 10/207,826

(22) Filed: Jul. 31, 2002

(65) Prior Publication Data

US 2003/0024221 A1 Feb. 6, 2003

Related U.S. Application Data

(60) Provisional application No. 60/309,173, filed on Aug. 2, 2001.

(51) Int. Cl.$^7$ ............................................... A01D 34/03
(52) U.S. Cl. ............................................ 56/1; 56/17.5
(58) Field of Search .............................. 56/14.7, 16.7, 56/17.4, 17.5, 255, 289, 295, DIG. 17, 1, 320.1; 29/281.1

(56) References Cited

U.S. PATENT DOCUMENTS

| | | | |
|---|---|---|---|
| 2,993,518 A | * 7/1961 | Bork ........................... 30/391 |
| 3,101,629 A | * 8/1963 | Koelndorfer ................ 76/82.1 |
| 3,173,234 A | 3/1965 | Vodinelich |
| 3,901,117 A | * 8/1975 | Hoffman ...................... 83/835 |
| 4,032,160 A | * 6/1977 | Karasa et al. ............... 279/149 |
| 4,208,859 A | 6/1980 | Brockway |
| 4,297,921 A | * 11/1981 | Wydra ......................... 81/488 |
| 4,457,033 A | * 7/1984 | Lightner ........................ 7/138 |
| 4,478,028 A | * 10/1984 | Dawson, Jr. ................. 56/16.9 |
| 4,564,991 A | 1/1986 | Taylor |
| 4,736,544 A | 4/1988 | Greenquist |
| 4,860,525 A | 8/1989 | Chee |
| 4,865,240 A | * 9/1989 | Moreschi ..................... 224/401 |
| 4,882,960 A | 11/1989 | Kugler |
| 4,896,746 A | * 1/1990 | Desjardins ................... 184/92 |
| D309,855 S | 8/1990 | Davidson |
| 4,956,905 A | 9/1990 | Davidson |
| 5,040,711 A | * 8/1991 | Niederhauser et al. ...... 224/572 |
| 5,417,353 A | * 5/1995 | Stall ........................... 224/401 |
| 5,791,131 A | 8/1998 | Hill et al. |
| 5,865,018 A | 2/1999 | Wanie |
| 6,415,591 B1 | * 7/2002 | Tylka, Sr. .................... 56/295 |
| 6,634,161 B2 | * 10/2003 | Williams .................... 56/17.5 |

* cited by examiner

Primary Examiner—Thomas B. Will
Assistant Examiner—Alicia Torres
(74) Attorney, Agent, or Firm—Diederiks & Whitelaw, PLC

(57) ABSTRACT

A blade holding assembly for use in changing a blade of a rotary cutting machine includes a blade fixing element which can be selectively moved between a storage condition, wherein the blade fixing element is mounted to the machine in an unobtrusive position, and an in-use condition, wherein the blade fixing element is remounted in a position which obstructs the rotation of the blade. More specifically, in the in-use condition, the blade fixing element preferably projects through or otherwise engages the blade to prevent the blade from rotating in either direction. In accordance with the most preferred form of the invention, the blade fixing element is adapted to extend through a hole provided in the blade and is threadably attached to a retainer element carried by the rotary cutting machine to secure the blade against rotation in a hands free manner.

16 Claims, 2 Drawing Sheets

BLADE HOLDING ASSEMBLY FOR ROTARY CUTTING MACHINE

CROSS-REFERENCE TO RELATED APPLICATIONS

The present application claims the benefit of U.S. Provisional Patent Application Ser. No. 60/309,173 filed Aug. 2, 2001.

BACKGROUND OF THE INVENTION

1. Field of the Invention

The present invention pertains to the art of rotary cutting machines and, more particularly, to a blade holding assembly for such a machine.

2. Discussion of the Prior Art

There exists various types of rotary cutting machines incorporating blades which need to be disconnected from a drive source in order to be periodically replaced or sharpened. For example, lawn mower blades should be sharpened or replaced at least yearly for peak effectiveness. In general, removing a lawn mower blade requires somehow retaining the blade from rotating while removing a retaining bolt used to drivingly interconnect the blade to an engine shaft. Removing a blade retaining bolt can often be difficult, and even dangerous. In fact, it is not uncommon for a retaining bolt to be over tightened or even rusted in place.

Regardless of the condition of the retaining bolt, it is necessary to prevent the blade from rotating while the high torque necessary to loosen the bolt can be applied, generally through the use of a wrench. Oftentimes, when changing a blade on a lawn mower, a block of wood, a brick or other handy object is initially placed between the blade and a discharge chute or other deck portion of the mower to prevent the blade from shifting as the bolt is being rotated. If the object slips, a cut or bruised hand may result. In addition, these types of arrangements can result in the potentially dangerous condition of blade kickback, particularly if the blade is only held against rotation in one direction. As an alternative, one can resort to utilizing leather work gloves for holding a blade secure while the bolt is loosened. This type of arrangement is not always effective as merely grasping the end of the blade with a gloved hand may not enable sufficient leverage to be developed to enable an overly tightened or rusted bolt to be removed. In addition, depending upon the condition of the blade and the quality of the gloves, this operation may be hazardous.

The problems associated with removing or installing a blade on a lawn mower can be further compounded by the ground level location of the blade. That is, the blade may only be limitedly visible and accessible through the discharge chute unless the mower is run up on blocks, elevated on jacks, tilted backwardly or turned upside down. Although a push-type lawn mower can be fairly easily placed on its side to enhance access to the blade, the same is not possible in connection with a riding lawn mower. Oftentimes, even a heavy riding lawn mower is not elevated on blocks just to remove or install a blade. Instead the mower deck is simply elevated as far as possible which generally provides about 5 inches (approximately 12.5 cm) of visibility and working space for a person lying or crouching on the ground.

Regardless of the degree of accessibility of the blade, changing a blade simply represents a potentially dangerous endeavor, particularly due to the problem of adequately preventing the blade from undesirability rotating. Therefore, providing a safe and effective system for changing a blade of a rotary cutting machine, i.e., either replacing a blade or removing it for sharpening and then reinstalling the same, is considered an important issue which needs to be addressed in connection with lawn mowers, as well as other rotary cutting machines.

Based on the above, there exists a need in the art for a blade holding system which can be effectively used to either remove or mount a blade to a rotary cutting machine under a wide range of conditions. More particularly, there exists a need for an arrangement which provides for maintaining a rotatable blade in a fixed position in a hands free manner such that an extremely safe system is provided. In addition, there exists a need for such a blade changing arrangement wherein the structure for holding the blade is advantageously carried by the machine so as to be readily available, while being conveniently movable to an unobstructing storage position when not needed.

SUMMARY OF THE INVENTION

The present invention is directed to a blade holding assembly for use in changing a blade of a rotary cutting machine. More specifically, the blade holding assembly includes a blade fixing element which can be selectively moved between a storage condition, wherein the blade fixing element is mounted to the machine in an unobtrusive position, and an in-use condition, wherein the blade fixing element is remounted in a position which obstructs the rotation of the blade. More specifically, in the in-use condition, the blade fixing element preferably projects through or otherwise engages the blade to prevent the blade from rotating in either direction. In accordance with the most preferred form of the invention, the blade fixing element is adapted to extend through a hole provided in the blade to secure the blade against rotation in a hands free manner.

The present invention is particularly applicable for use in connection with installing or removing the blade of a lawn mower. The blade holding assembly can be readily incorporated into the manufacture of new rotary cutting machines or supplied as a retrofit attachment. In accordance with one preferred embodiment of the invention, the blade holding assembly includes an easily gripped blade fixing element in the form of a partially threaded rod which can be selectively shifted to project either above the deck of a lawn mower in a storage condition or below the deck and through a mower blade in an in-use condition.

Additional objects, features and advantages of the present invention will become more readily apparent from the following detailed description of preferred embodiments thereof when taken in conjunction with the drawings wherein like reference numerals refer to corresponding parts in the several views.

DETAILED DESCRIPTION OF THE PREFERRED EMBODIMENTS

Figure 1:
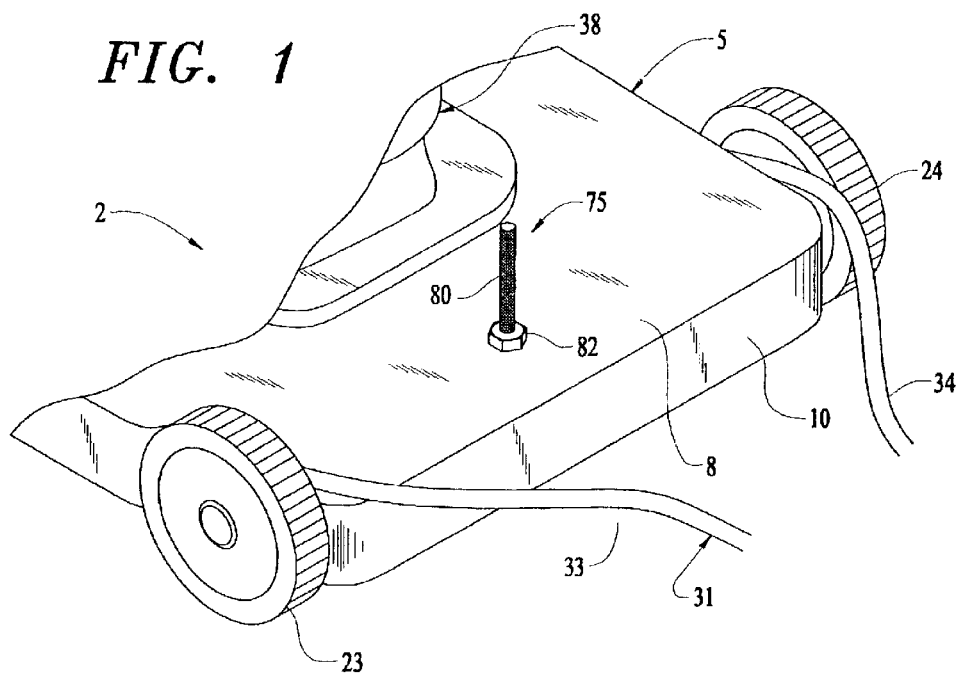
FIG. 1 is a partial perspective view of a lawn mower illustrating the blade holding assembly of the present invention in a storage or nonuse condition.
Figure 3:
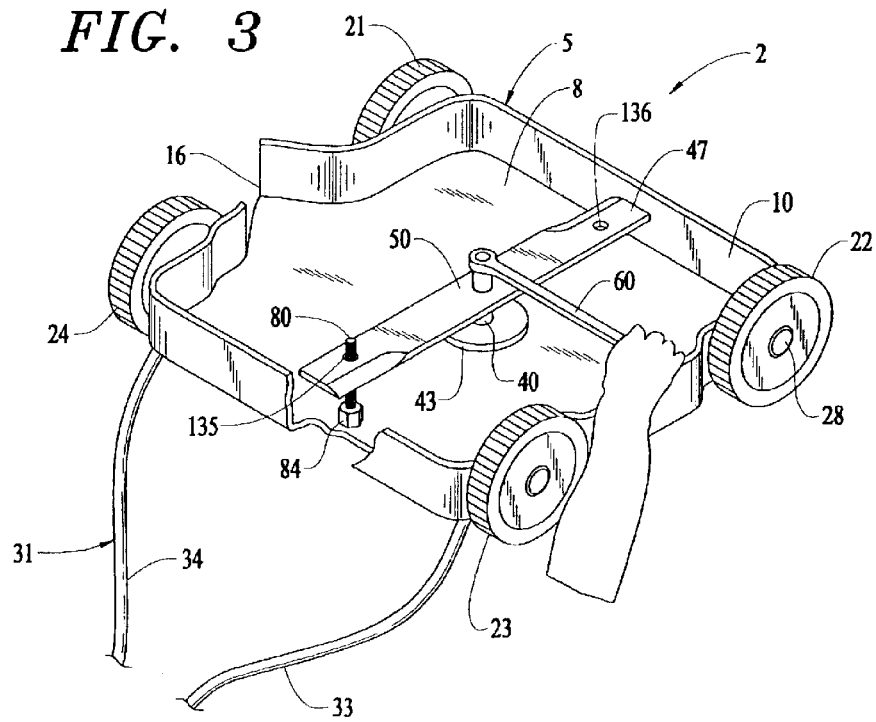
FIG. 3 is perspective view of the lawn mower of FIG. 1 shown inverted and with the blade holding assembly in an in-use condition.

With initial reference to FIGS. 1 and 3, a lawn mower 2 is depicted having a deck 5. In a manner generally known in the art, deck 5 is defined by an upper panel portion 8 and a peripheral side panel portion 10. Peripheral side panel portion 10 defines a discharge opening or chute indicated at 16. Deck 5 has attached thereto a plurality of wheels 21–24. More specifically, wheels 21–24 are mounted for rotation to deck 5 by any means known in the art, such as the use of respective bolts, one of which is indicated at 28. Lawn mower 2 is provided with a handle, partially indicated at 31, including legs 33 and 34. In the embodiment shown, lawn mower 2 depicts a push mower of the type generally known in the art. However, as will become more apparent below, the present invention is equally applicable to other types of lawn mowers, including self-propelled and tractor-type mowers, as well as other types of machines having rotary cutters such as portable brush cutters, edgers and the like.

Lawn mower 2 has associated therewith an engine 38 that includes a driveshaft 40 which projects through a generally central section of upper panel portion 8 of deck 5. As shown, driveshaft 40 is supported by a plate 43 for rotation relative to deck 5. Attached to driveshaft 40, for concurrent rotation therewith, is a blade 47. At this point, it should be realized that the general construction of lawn mower 2 as described above is known in the art. In a manner also widely known in the art, a retaining bolt (not shown) is preferably threaded to driveshaft 40 at a central section 50 of blade 47 to drivingly interconnect blade 47 with driveshaft 40 for concurrent rotation. A wrench 60 is shown positioned on the bolt in FIG. 3 as will be discussed more fully below. The present invention is particularly directed to the manner in which blade 47 can be attached to or removed from driveshaft 40 while preventing blade 47 from inadvertently rotating, preferably in a hands free manner. In accordance with a preferred embodiment of the invention, blade 47 is retained against undesired rotation through the use of a blade holding assembly 75 which will now be described in detail.

Figure 2:
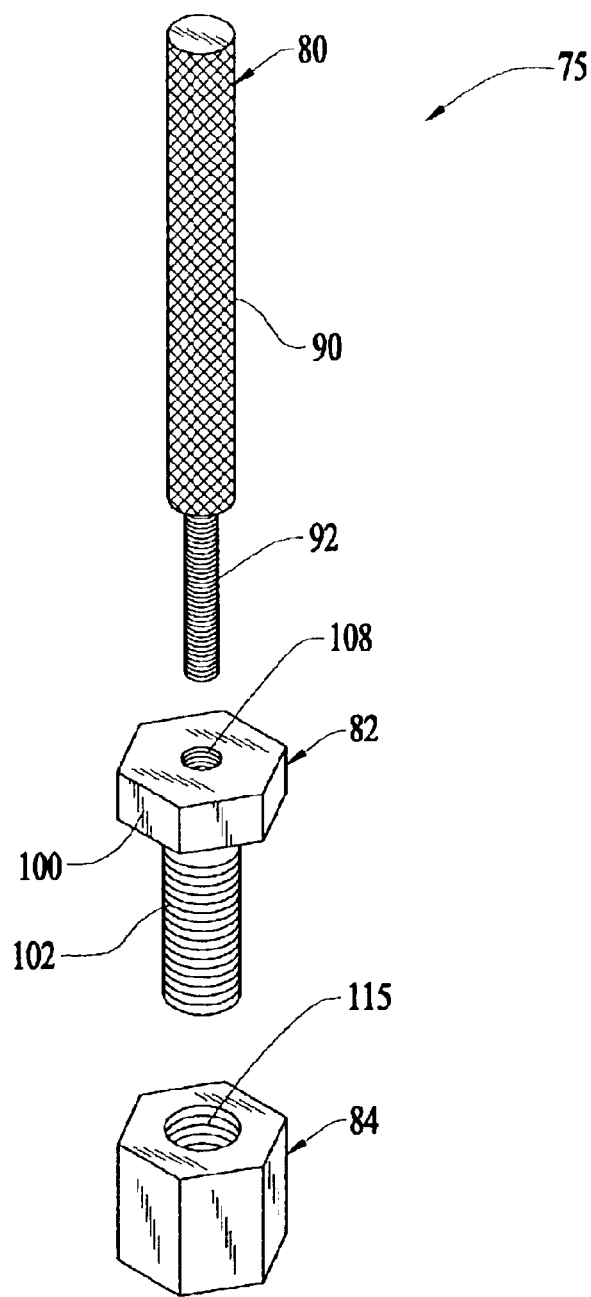
FIG. 2 is an exploded view of the components of the blade holding assembly in accordance with a preferred embodiment of the invention.

As perhaps best shown in FIG. 2, blade holding assembly 75 includes a blade fixing element 80, an upper connecting element 82 and a lower connecting element 84. Blade fixing element 80 includes a rod portion 90 and a threaded shaft portion 92. As shown, rod portion 90 is preferably knurled to provide for superior gripping thereof. Upper connecting element 82 includes an upper nut portion 100 and an integral shank 102 which is externally threaded. Upper connecting element 82 is also provided with a threaded bore 108 which extends completely through both upper nut portion 100 and integral shank 102. As will be discussed more fully below, threaded bore 108 is configured to threadably receive shaft portion 92 of blade fixing element 80 from either end of upper connecting element 82. Lower connecting element 84 basically constitutes a nut having internal threads 115 which are adapted to threadably receive shank 102.

Although the materials of blade holding assembly 75 can greatly vary in accordance with the invention, in the most preferred form shown, each of blade fixing element 80, upper connecting element 82 and lower connecting element 84 is machined from metal. Dimensionally, blade holding assembly 75 can also vary. However, in the embodiment shown wherein blade holding assembly 75 is provided for a conventional push lawn mower 2, rod portion 90 is in the order of 3–4 inches in length and ½ inches in diameter. Threaded shaft portion 92 is ¼ inch in diameter and approximately 1¼ inches long. Upper connecting element 82 is 1¼ inches long, with a 1 inch diametric facet-to-facet dimension for nut portion 100 and a ⅝ inch diameter, ⅞ inch long shank 102. Finally, lower connecting element 84 constitutes a 1 inch nut having a height of ¾ inches. Of course, it should be readily apparent that these dimensions are exemplary only and could readily vary in accordance with the invention.

In use, blade holding assembly 75 is initially attached to deck 5 by forming a hole in deck 5 which receives shaft portion 102 of upper connecting element 82. Below deck 5, lower connecting element 84 is threaded onto shank 102. Upon tightening upper and lower connecting elements 82 and 84, deck 5 gets sandwiched therebetween. Based on a typical thickness for deck 5 in the order of 1/16–⅛ of an inch, along with the dimensions given above for shank 102 and lower connecting element 84, shank 102 extends within and terminates substantially flush with lower connecting element 84. In this manner, grass and other debris cannot enter the area of internal threads 115. In any event, upper and lower connecting elements 82 and 84 are fixedly secured to deck 5, with nut portion 100 being arranged atop deck 5 and lower connecting element 84 below deck 5 as clearly shown in FIGS. 1 and 3 respectively.

As indicated above, blade holding assembly 75 is movable between storage and in-use conditions. More specifically, FIG. 1 shows blade holding assembly 75 in its storage condition wherein blade fixing element 80 extends above deck 5, with shaft 2 portion 92 being threaded into bore 108. Based on the preferred dimensions provided, the terminal end of shaft portion 92 is substantially flush with an exposed end surface of lower connecting element 84 in order to avoid any debris from getting into bore 108. In this position, lawn mower 2 can be operated in a conventional manner with blade holding assembly 75 simply remaining in the position shown in this figure.

When it is desired to, for example, detach blade 47 from driveshaft 40, blade fixing element 80 is initially unscrewed from upper connecting element 82. With lawn mower 2 inverted as shown in FIG. 3, blade fixing element 80 is inserted through a hole 135 formed in blade 47. Actually, at least for balancing reasons, a pair of holes 135 and 136, each preferably circular and spaced along blade 47 from driveshaft 40, are preferably provided. Thereafter, shaft portion 92 of blade fixing element 80 is again threaded into bore 108, but from below deck 5. In this in-use condition, it should be readily apparent that rod portion 90 extends both above and below blade 47. With this arrangement, blade 47 is advantageously fixed against rotation in either direction in an extremely safe, hands free manner. In this in-use condition, wrench 60 can be readily utilized in removing the retaining bolt for blade 47. In a corresponding manner, blade fixing element 80 can be equally utilized to maintain blade 47 against rotation during attachment to driveshaft 40 in a corresponding manner.

Although described with respect to a preferred embodiment of the invention, it should be readily apparent that various changes and/or modifications can be made to the invention without departing from the spirit thereof. For instance, although particularly described with reference to lawn mower 2, it should be recognized that blades of other known types of rotary cutting machines, including motorized brush cutters, edgers and the like, could be advantageously changed in a corresponding manner. Of course, a variety of tools could be utilized in combination with the invention. More importantly, it should be realized that the main advantages of the present invention could be achieved in various ways. For instance, if retrofitted to a lawn mower not including a blade provided with one or more holes for blade fixing element 80, blade holding assembly 75 could be utilized in the same manner discussed above, except that rod portion 80 would be abutted by a side edge portion of the blade to prevent uni-directional rotation of the blade, while still avoiding direct contact between a user and the blade.

Broadly, the blade holding assembly 75 of the present invention represents an arrangement which is advantageously carried by the mower so as to avoid any need to find components stored in a remote area when needing to maintain a rotatable blade in a fixed position, effectively addresses present safety concerns in connection with changing the blade of a mower or other rotary machine by establishing a hands free operation, and presents a simple and reliable system which can be readily employed in a wide range of machines, either during manufacturing or through a quick retrofit. Therefore, the actual embodiment employed could greatly vary in accordance with the invention while still displaying these features. For instance, a single, internally threaded connecting element could be welded or otherwise secured to deck 5 to receive blade fixing element 80 directly. In addition, although threaded connections have been employed in establishing the storage and in-use conditions, other types of connections known in the art could be employed to secure a blade fixing element of the invention to a lawn mower or other machine in each of the storage and in-use conditions. For instance, a blade fixing element could be clipped in a storage condition to structure on the machine, while still being movable to retain the blade fixed in a hands free manner, preferably preventing rotation of the blade in either direction. Furthermore, rod portion 90 could take other shapes and forms, such as a general T-shape in order to define an integrated handle. Of course, other variations of the invention will be readily apparent to those of ordinary skill in this art upon reading and understanding the above description.

What is claimed is:

1. A rotary cutting machine comprising:
    a deck;
    a motor mounted on the deck, said motor including a driveshaft extending through the deck;
    a blade including first and second, longitudinally spaced end portions and a central portion located longitudinally between the first and second end portions, each of said first and second end portions having at least one sharp edge, said blade being positioned below the deck and drivingly connected to the driveshaft at the central portion for rotation in a substantially horizontal plane;
    a blade fixing element selectively movable between a storage condition, wherein the blade fixing element is mounted to the deck in a first position which does not obstruct rotation of the blade, and an in-use condition, wherein the blade fixing element is remounted to the deck in a second position which obstructs the rotation of the blade to enable detaching the blade from the driveshaft; and
    first and second connecting elements secured to the deck, said blade fixing element being attached to the deck through the first and second connecting elements.

2. The rotary cutting machine according to claim 1, wherein said blade is provided with at least one opening spaced from the central portion, said blade fixing element extending through the opening when in the second position.

3. The rotary cutting machine according to claim 1, wherein the blade fixing element constitutes a rod having a threaded portion.

4. The rotary cutting machine according to claim 3, wherein the rod includes a grip portion spaced from the threaded portion, said grip portion having an outer, knurled surface.

5. A rotary cutting machine comprising:
    a motor including a driveshaft;
    a, blade including first and second, longitudinally spaced end portions, a central portion located longitudinally between the first and second end portions, and at least one opening spaced from the central portion, each of said first and second end portions having at least one sharp edge, said blade being drivingly connected to the driveshaft at the central portion;
    a blade fixing element selectively movable between a storage condition, wherein the blade fixing element is mounted to the machine in a first position which does not obstruct rotation of the blade, and an in-use condition, wherein the blade fixing element is remounted in a second position extending through the opening so as to obstruct the rotation of the blade; and
    a connecting element secured to the machine, said blade fixing element being attached to the connecting element in each of the storage and in-use conditions.

6. A rotary cutting machine comprising;
    a motor including a driveshaft;
    a blade including first and second, longitudinally spaced end portions and a central portion located longitudinally between the first and second end portions, each of said first and second end portions having at least one sharp edge, said blade being drivingly connected to the driveshaft at the central portion;
    a blade fixing element selectively movable between a storage condition, wherein the blade fixing element is mounted to the machine in a first position which does not obstruct rotation of the blade, and an in-use condition, wherein the blade fixing element is remounted in a second position which obstructs the rotation of the blade; and
    a connecting element secured to the machine, said blade fixing element being threadably attached to the connecting element in each of the storage and in-use conditions.

7. The rotary cutting machine according to claim 6, wherein the connecting element comprises an internally threaded nut fixedly secured to the rotary cutting machine.

8. The rotary cutting machine according to claim 7, wherein the rotary cutting machine comprises a lawn mower having a dock, said retainer element being fixed to the deck.

9. The rotary cutting machine according to claim 8, wherein the blade fixing element can be selectively shifted to project either above the deck of the lawn mower in the storage condition or below the deck in the in-use condition.

10. The rotary cutting machine according to claim 9, wherein said blade is provided with at least one opening spaced from the central portion, said blade fixing element extending through the opening when in the second position.

11. A rotary cutting machine comprising:
    a motor including a driveshaft;
    a blade including first and second, longitudinally spaced end portions and a central portion located longitudinally between the first and second end portions, each of said first and second end portions having at least one sharp edge, said blade being drivingly connected to the driveshaft at the central portion;
    a blade fixing element selectively movable between a storage condition, wherein the blade fixing element is mounted to the machine in a first position which does not obstruct rotation of the blade, and an in-use condition, wherein the blade fixing element is remounted in a second position which obstructs the rotation of the blade; and
    first and second connecting elements secured to the machine, said blade fixing element being attached to the machine through the first and second connecting elements, wherein the first connecting element includes a an internally threaded nut portion, an integral, externally threaded shank portion and an internally threaded bore.

12. The rotary cutting machine according to claim 11, wherein the internally threaded bore extends through both the nut portion and the shank portion.

13. The rotary cutting machine according to claim 12, wherein the blade fixing element includes a shaft portion threadably attached within the threaded bore.

14. The rotary cutting machine according to claim 13, wherein the second connecting element comprises a nut member which is threadably attached to the shank portion.

15. The rotary cutting machine according to claim>wherein the rotary cutting machine comprises a lawn mower having a deck, said shank portion projecting through the deck, with the deck being sandwiched between the nut portion and the nut member.

16. The rotary cutting machine according to claim 15, wherein the shank portion has a terminal end which extends within and is substantially flush with the second connecting element.

* * * * *